3,102,134
PREPARATION OF MENTHENYL ESTERS
AND ETHERS
Joseph P. Bain and Robert L. Webb, Jacksonville, Fla., assignors to The Glidden Company, Cleveland, Ohio, a corporation of Ohio
No Drawing. Filed Sept. 14, 1961, Ser. No. 137,999
5 Claims. (Cl. 260—489)

The present invention relates to a novel method for treating 3-p-menthene, and particularly to the production of derivatives of p-menthane oxygenated at the 3-position.

3-p-methene is a readily available material obtainable by a number of convenient processes, such as by dehydration of dihydro-α-terpineol, followed by isomerization. It would be highly desirable, therefore, to provide a convenient process for producing menthols and other 3-oxygenated p-menthane derivatives from 3-p-menthene.

It is accordingly an object of the present invention to provide a novel process for treating 3-p-menthene.

Another object is to provide a process for converting 3-p-menthene to 3-oxygenated compounds of the p-menthane series.

An additional object is to provide new compounds of the p-menthane series which are useful intermediates in the production of 3-oxygenated compounds of the p-menthane series.

Other objects will be apparent from the following description.

The process of our invention comprises chlorinating 3-p-menthene to obtain a chlorinated product consisting largely of 5-chloro-3-menthene, together with smaller amounts of 3,4-dichloro menthane and converting these products to esters and ethers of 3-menthene-5-ol.

The 3-menthene employed need not be highly purified if the impurities do not chlorinate as rapidly as the 3-menthene, or if the chlorides of the impurities are readily separated from the 3-menthene chlorination products or from the hydrolysis products thereof. Thus, if a mixture of 2-p-menthene and 3-p-menthene is chlorinated with chlorine gas until the amount of chlorine added corresponds to the molar quantity of 3-menthene present, it will be found that the 3-menthene has been chlorinated but the 2-menthene present has not reacted appreciably and can be recovered unchanged. It is therefore evident that 3-menthene is very easily and rapidly chlorinated as compared to 2-menthene.

It is known to chlorinate hydrocarbons with various chlorinating agents. However, chlorine itself is the cheapest of these and is a very satisfactory chlorinating agent, and we prefer to employ it.

In conducting the chlorination of 3-p-menthene, we find that chlorination conditions are not critical and that good yields of 5-chloro-3-menthene are obtained when chlorine is passed into 3-menthene at room temperature or below, or above room temperature. Somewhat more 3,4-dichlor-menthane is produced at lower temperatures, however, and we prefer to chlorinate at somewhat higher temperatures, suitably 90° to 120° C. if the reaction is to be conducted in the liquid phase, or at 200° C. and upwards if both reactants are to be employed in the vapor phase.

Any suitable chlorination vessel, such as a glass-lined vessel, may be employed. The reaction is exothermic, and cooling may be employed to control the temperature. The hydrogen chloride produced is permitted to escape from the reaction as formed.

In general, we prefer to pass gaseous chlorine into the 3-menthene at such a rate that the temperature can be controlled by the available cooling capacity and in total quantity corresponding to about one mole of chlorine to each mole of 3-menthene present.

While 3,4-dichloro-menthane is useful in producing 3-p-menthene-5-ol, it is much more difficult to convert than is the substitution product 5-chloro-3-p-menthene, a reactive allylic chloride.

When the chlorination step is completed, the product can be fractionated to separate any unreacted hydrocarbon from the chlorination products and the chlorination products from each other.

It has been found that the crude chlorination product can be heated with carboxylic acid salts of alkali metals to produce the esters and ethers or alkali metal alcoholates to produce the esters and ethers of 3-p-menthene-5-ol, respectively. Alternatively the chlorination mixture can be fractionated and the chlorinated fractions subjected to the treatment with the alkali metal compound. However, fractional distillation of chlorides is known to require special equipment to withstand the corrosive effects of the chlorides and it is therefore preferred to treat the chlorination mixture.

The replacement reaction can be conveniently carried out by treatment with salts of acids such as potassium acid phthalate, sodium acetate, sodium formate, etc., to yield esters of 3-menthene-5-ol with the acids of the salts used. These replacement reactions are carried out under substantially anhydrous conditions and can be carried out in the presence or absence of additional solvents.

The ethers of 3-menthene-5-ol can be prepared by heating the chlorination mixture or the 5-chloro-3-menthene with the alkali metal alcoholate of the other alcohol.

The esters formed in accordance with the present invention can be readily saponified to the alcohol. The ethers are readily converted to esters by treatment with carboxylic acids in accordance with the procedures of U.S. Patent No. 2,935,526.

The free alcohol can be prepared by hydrolysis of the ester. The oil layer from the hydrolysis can be suitably treated by fractionation to yield as pure a form of 3-menthene-5-ol as is desirable. Alternatively purification can take place at the ester or ether stage, particularly in the case of readily crystalline materials such as the acid phthalate.

Purified 3-p-menthene-5-ol readily hydrogenates to iso-menthol over $PtO_2$ catalysts and at ambient temperatures and under a hydrogen pressure of 50 lbs. per square inch or less. This shows that the alcohol is largely the trans-form. Hydrogenation may be accomplished also with other catalysts, such as copper chromite or nickel. With the latter catalysts and combinations of these, it will be found desirable to use somewhat higher temperatures, up to 200° C. or even higher, and pressures up to 1000 lbs. per square inch of hydrogen, or more. Under these conditions, the isomenthol which is first formed may be equilibrated to a mixture of all four menthol isomers if the temperature is high enough and the time sufficient. In such completely equilibrated mixtures, dl-menthol predominates and can be recovered by means well known to the art.

Alternatively, 3-menthene-5-ol, even if it contains hydrogenation catalyst poisons, can be treated with a strong alkali, whereby at least partial disproportionation results and other valuable compounds are produced. For example, 3-menthene-5-ol can be treated with 5% of its weight of potassium hydroxide at around 200° C. for several hours, the product then cooled, washed with water to remove alkali and fractionated. The product contains unreacted 3-menthene-5-ol, menthol, menthone and menthenone, which can be separated by any suitable methods or the whole can be hydrogenated to mixed menthols.

Similarly, the 3-menthene-5-ol can be treated with, say 2% of its weight of sodium metal, and heated to 150–160° C. for several hours whereby little of the unsaturated alcohol remains and the product consists of a mixture of thymol, menthone, menthenone and menthols. This product can be readily reduced with sodium in alcohol to form a mixture of menthols.

If desired, 3-menthene-5-ol can be readily oxidized by chromic acid-sulfuric acid mixture to the corresponding menthenone. The menthenone can also be prepared by Oppenauer oxidation of the alcohol.

There are, therefore, a number of treatments available for conversion of 3-menthene-5-ol to valuable 3-oxygenated derivatives of p-menthane, which are useful, particularly in flavors and medicinal preparations.

It will, of course, be apparent that the esters and ethers of 3-menthene-5-ol can be hydrogenated to yield the esters and ethers of isomenthol.

EXAMPLE 1

A mixture of 40% 2-p-menthene and 60% 3-p-menthene, 665 pounds, was reacted with 204 pounds of chlorine at 65–98° C. The chlorination was carried out by bubbling chlorine into the hydrocarbon mixture at 65° C. The addition was exothermic and hydrogen chloride was evolved. The temperature was maintained at 90–98° C. by cooling the reaction vessel. When all of the chlorine had been added, the chlorination product was then cooled and recovered to yield 784 pounds.

Fractionation of a small portion of the chlorination product through an efficient glass-packed column at 10 mm. pressure gave: 34% hydrocarbons, B.P. 10 mm., 45° C.; 52% 5-chloro-3-menthene, B.P. 10 mm., 87° C., $N_D^{25}$ 1.4669, $D_4^{25}$ 0.9494; and 14% 3,4-dichloro-p-menthane, B.P. 10 mm., 104° C., $N_4^{25}$ 1.4840, $D_4^{25}$ 1.0456.

Identification of Compounds

The hydrocarbon was identified as a mixture of cis- and trans-2-p-menthene by comparing its infrared spectrum with the spectra of the known compounds.

The infrared spectrum of the monochloride indicated that it contained a trisubstituted ethylenic bond, as shown by the presence of the characteristic trisubstituted ethylenic bond absorption at $12.3\mu$. Dehydrochlorination by refluxing with 50% alcoholic KOH gave a hydrocarbon having the following properties: B.P. 10 mm., 47.5° C., $N_4^{25}$ 1.4638, $D_4^{25}$ 0.8209. The infrared spectrum of the hydrogenation product containing 45% 2-p-menthene substituted ethylenic bond and a trisubstituted ethylenic bond as shown by the presence of the characteristic absorptions at $13.75\mu$ and $12.3\mu$, respectively.

The ultraviolet spectrum of the hydrocarbon indicated that it was a conjugate diene having an absorption peak at $260\mu$ and an extinction coefficient, $$E_{1\,cm.}^{1\%} \text{ of } 31$$

Catalytic addition of 1 mole of hydrogen to the hydrocarbon, in the presence of 0.2% by weight of $PtO_2$ at 25–30° C., under a hydrogen pressure of 40–60 p.s.i., gave a hydrogenation product containing 45% 2-p-menthene and 55% 3-p-menthene as determined by infrared spectroanalysis.

From the above data, it is evident that dehydrochlorination of the monochloride produces 2,4-p-menthadiene, and therefore the monochloride must be 5-chloro-3-p-menthene.

Dehydrochlorination of the dichloride by heating it with calcium hydroxide at about 175 to 200° C. gave 2,4-p-menthadiene as determined by infrared spectroanalysis. In the absence of any unlikely rearrangements, the dichloride must be 3,4-dichloro-p-menthane.

EXAMPLE 2

Five hundred grams of the chlorination product from Example 1 and 400 grams of potassium acid phthalate were stirred together for 4 hours at 100–110° C. The oil was then washed with water and dried. The dried oil was allowed to crystallize by keeping it at −15° C. overnight. The crystals formed were recrystallized from ethyl acetate. The purified acid phthalate, M.P. 123° C., was saponified using alcoholic KOH. Infrared spectroanalysis of the oil recovered from the saponification showed that it was 3-p-menthene-5-ol.

EXAMPLE 3

Three hundred grams of the chlorination product from Example 1, 150 grams of anhydrous sodium acetate and 300 ml. of acetic acid were mixed together and stirred at reflux, 115–120° C., for 3 hours. The product was washed with water and a 10% $Na_2CO_3$ solution to remove acetic acid. The washed oil was dried and fractionated in the presence of 2.0% sodium acetate. Infrared spectroanalysis of the fractions showed that the reaction product was 28% 3-p-menthenyl-5-acetate. The fractions boiling at 98–99° C. at 10 mm. pressure were high purity 3-p-menthenyl-5-acetate.

EXAMPLE 4

One hundred grams of 5-chloro-3-menthene was added to one liter of n-butanol in which 15 grams sodium metal had been dissolved. The mixture was heated at 150° C. for 3 hours, washed with water and then fractionated. The butyl ether of 3-menthene-5-ol boiled at about 107° C. at 10 mm., $n_D^{25}$ 1.4511. It hydrogenated readily to isomenthyl butyl ether over $PtO_2$ at 50 lbs. per square inch hydrogen pressure. Its infrared spectrum was identical with that of the reaction product of sodium isomentholate and butyl bromide.

EXAMPLE 5

One hundred grams of the chlorination product of Example 1 was added to 1 liter of methanol in which 15 grams of metallic sodium had been dissolved. The mixture was heated at 50° C. for 3 hours. The methyl ether of 3-menthene was recovered by fractionation, and 10 grams thereof was mixed with 30 ml. of buffered formic acid obtained by dissolving 15 grams of sodium acetate in 100 ml. of 90% formic acid. This mixture was stirred for 12 hours. Two phases were present. The formate of 3-menthene-5-ol was recovered which, upon hydrolysis and hydrogenation in either order, leads to a mixture of isomeric menthols which upon equilibration gives a mixture which is predominantly menthol.

It is to be understood that the foregoing examples are illustrative and that numerous variations therefore are possible. As previously indicated other chlorinating agents than chlorine itself can be employed. Also, other alkali metal salts of carboxylic acids can be employed for the displacement reaction. As indicated also it is preferred to have substantially anhydrous conditions. Replacement of course proceeds in the presence of small amounts of water. However when water is present under alkaline conditions there is a competing hydrolysis reaction which becomes the predominating reaction when substantial amounts of water are present. This hydrolysis reaction is the one claimed in Serial No. 499,226, filed April 4, 1955, now Patent No. 3,014,080, of which this case is a continuation-in-part.

In most instances salts of lower carboxylic acids and the alcoholates of lower molecular weight alcohols will be employed. However, where high boiling esters or ethers of either the menthenol or menthol are desired, they can be formed by using the corresponding salt or alcoholate in the process of the present invention.

The temperature of the replacement reaction is not critical but in general as high a temperature as is practical without thermal cracking is desirable since the higher the temperature the faster the rate of reaction. Thus, in Examples 2, 3 and 4, temperatures from 100° C. to 150° C. were employed, whereas when carrying out the replacement in the presence of volatile methanol in Example 5, a temperature of 50° C. was most feasible.

As can be seen from the examples, the replacement reaction can be carried out in the presence or absence of solvents. When a carboxylic acid solvent is used it preferable to use the acid corresponding to that of the salt used. In the case of the formation of the ethers at least an equimolecular amount of alcoholate to chloride present should be used but it is preferred, although not necessary, to have excess alcohol present as solvent.

This case is a continuation-in-part of Serial No. 499,226, filed April 4, 1955, now Patent No. 3,014,080.

Having thus described our invention, we claim:

1. The process for producing esters and ethers of 3-p-menthene-5-ol which comprises chlorinating 3-p-menthene by treating the same with not more than about an equimolecular quantity of elemental chlorine and subjecting resulting chlorinated material to a replacement reaction by heating the same with an alkali metal compound selected from the class consisting of alkali metal salts of carboxylic acids and alkali metal alcoholates under substantially anhydrous conditions.

2. The process of claim 1 in which the alkali metal compound is a salt of a carboxylic acid.

3. The process of claim 2 in which the salt is a salt of a lower hydrocarbon carboxylic acid and the reaction is carried out in the presence of the carboxylic acid corresponding to that of the salt.

4. The process of claim 1 in which the alkali metal compound is an alcoholate.

5. The process of claim 4 in which the alcoholate is the alcoholate of a low molecular weight alcohol.

References Cited in the file of this patent

UNITED STATES PATENTS 2,868,845    Webb _____ Jan. 13, 1959

UNITED STATES PATENT OFFICE
CERTIFICATE OF CORRECTION

Patent No. 3,102,134  August 27, 1963

Joseph P. Bain et al.

It is hereby certified that error appears in the above numbered patent requiring correction and that the said Letters Patent should read as corrected below.

Column 3, line 44, strike out "hydrogenation product containing 45% 2-p-menthene" and insert instead -- hydrocarbon indicated the presence of a symmetrically di- --.

Signed and sealed this 11th day of February 1964.

(SEAL)
Attest:
ERNEST W. SWIDER

Attesting Officer

EDWIN L. REYNOLDS

Acting Commissioner of Patents